Nov. 8, 1955    R. A. PASELK ET AL    2,723,092
ANTI-ICING RADOME
Filed Oct. 15, 1951    2 Sheets-Sheet 1

INVENTORS
ROBERT A. PASELK
GEORGE R. HUISMAN
NICHOLAS D. LO BUE
BY
*William L. Lane*
ATTORNEY Nov. 8, 1955  R. A. PASELK ET AL  2,723,092
ANTI-ICING RADOME
Filed Oct. 15, 1951  2 Sheets-Sheet 2

INVENTORS
ROBERT A. PASELK
GEORGE R. HUISMAN
BY  NICHOLAS D. LO BUE

ATTORNEY

United States Patent Office 2,723,092
Patented Nov. 8, 1955

2,723,092

ANTI-ICING RADOME

Robert A. Paselk, Gardena, George R. Huisman, Los Angeles, and Nicholas D. Lo Bue, Downey, Calif., assignors to North American Aviation, Inc.

Application October 15, 1951, Serial No. 251,382

9 Claims. (Cl. 244—134)

This invention relates to an aircraft anti-icing panel and more particularly to a panel for use as a radome.

An object of this invention is to provide a lightweight aircraft panel having highly efficient anti-icing characteristics.

Another object of this invention is to provide an aircraft panel having desirable radar transmission properties.

An additional object of this invention is to provide an aircraft panel that is structurally strong.

Still another object of this invention is to provide a panel having structurally reinforcing elements that will serve to direct heat for anti-icing to the locations where it is most needed and elements that will provide insulation so that a minimum of heat will be lost to the interior of the panel.

Figures 1, 2:
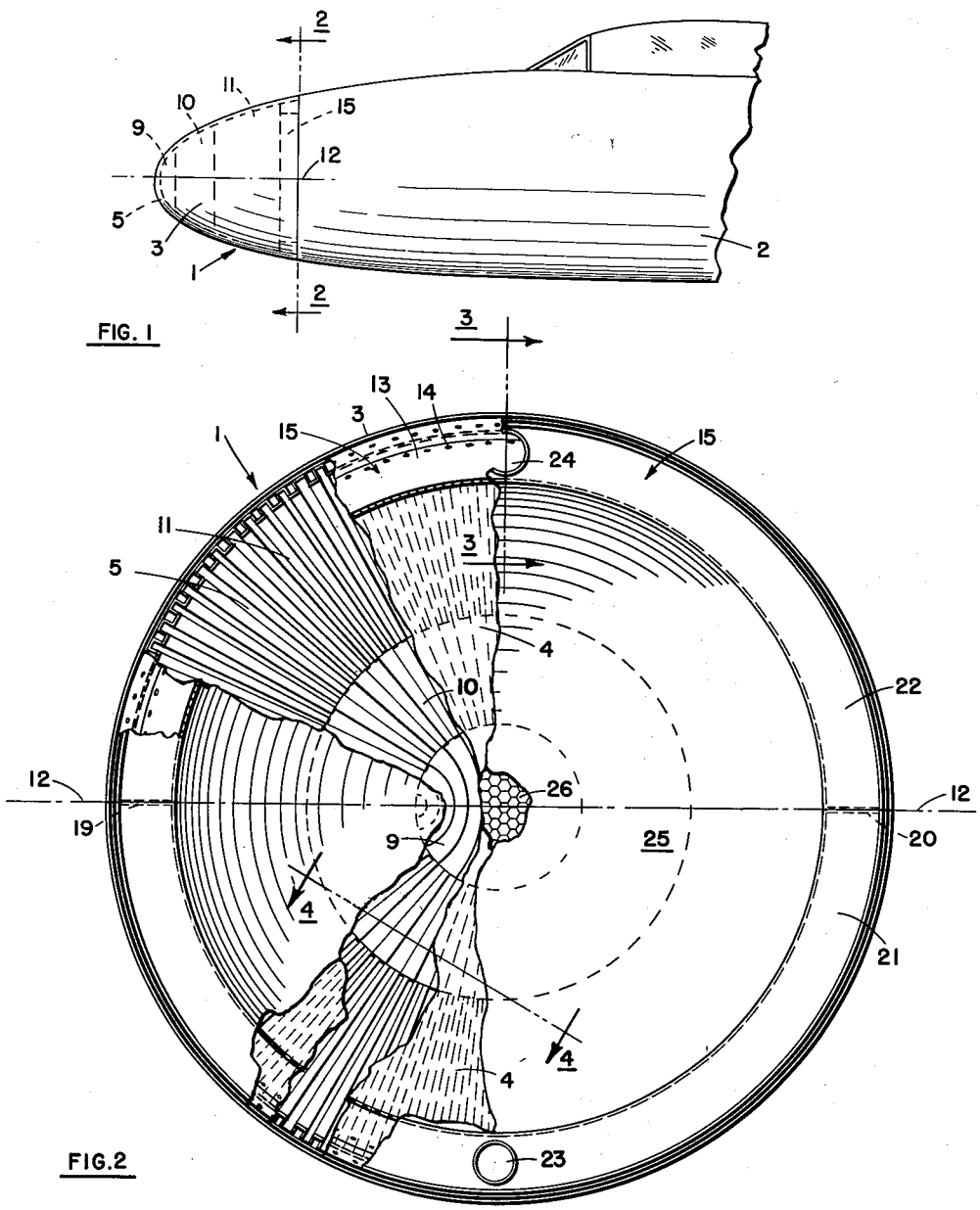
Figure 3:
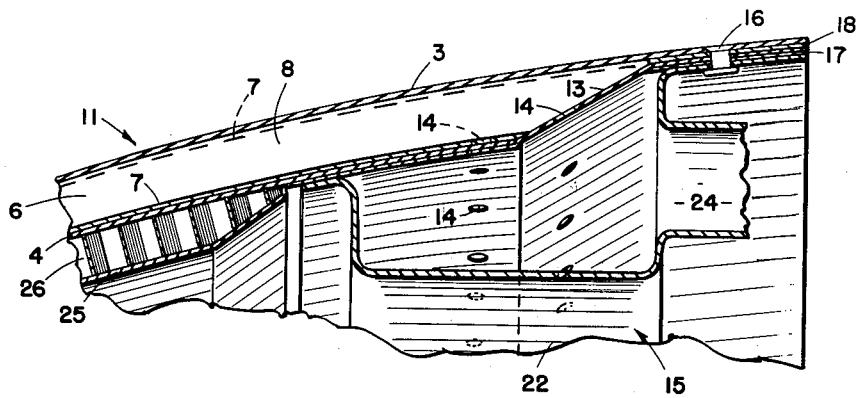
Figure 4:
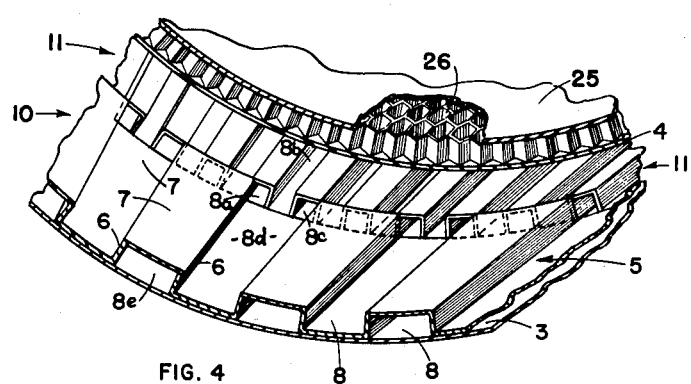
Figure 5:
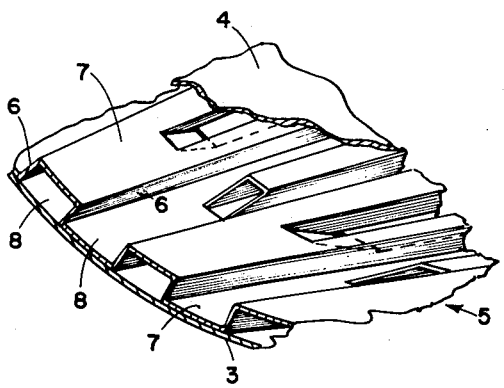

These and other objects will become apparent from the following description taken in connection with the accompanying drawings in which Fig. 1 is a side elevation of the panel attached to the nose of an aircraft fuselage, Fig. 2 is an elevation, partly in section, of the interior of the panel, Fig. 3 is a sectional view taken along line 3—3 of Fig. 2, Fig. 4 is a fragmentary perspective view taken along line 4—4 of Fig. 1 and partially broken away showing the construction of the panel, and Fig. 5 is a fragmentary perspective view of a modification of the construction shown in Fig. 4.

The anti-icing panel 1 of this invention will normally be of a streamlined conoidal exterior, such as illustrated in Fig. 1, which is adapted to house radar equipment within its hollow interior and to be attached to an aircraft fuselage 2. The structure of the panel includes two continuous walls 3 and 4 in spaced relationship with each other. A fluted core 5 is disposed between walls 3 and 4 as illustrated in Figs. 2, 4 and 5, this core being made up of walls 6 and spacing portions 7.

These spacing portions of the core are secured to walls 3 and 4 thereby securing walls 6 of the core in a position interconnecting walls 3 and 4 and preferably perpendicular to these walls. The core in this manner serves to rigidly hold walls 3 and 4 in a spaced relationship with each other and to supply reinforcement for the panel. Walls 3 and 4 may be parallel, but it has been found desirable to provide a slight convergence of these walls toward the rear of the panel to reduce the aberration of a radar beam passing through the panel. Any suitable adhesive or fastening means may secure portions 7 to the walls 3 and 4. In the preferred embodiment of the invention, walls 3 and 4 and core 5 are all made of a glass fiber reinforced lamination having a resinous binder. The adhesive for attaching the core 5 to walls 3 and 4 may be the same resin which is used as a binder or may be some other resin or adhesive material if desired. This adhesive should be of a type that will provide minimum disturbance to radar transmission.

A glass fiber lamination has been found to be particularly desirable for this anti-icing panel because it is light in weight, will provide excellent radar transmission characteristics, because with core 5 it is structurally strong and because it allows satisfactory heat transmission.

Walls 6 and 7 of the core not only serve to stiffen the structure and provide desirable strength characteristics but they also form passages 8 which extend longitudinally of the panel. It is desirable to construct the core in sections which in the present embodiment include front section 9, middle section 10 and rear section 11. A larger number of walls 6 are provided for rear section 11 than for middle section 10, and the middle section 10 has a larger number than front section 9, thus subdividing the passageways 8 toward the rear portion of the panel. For ease in manufacture these core sections may be independent of each other and because the joints between the sections occur toward the front portion of the panel where stress conditions are relatively low, the over all strength of the panel will remain sufficient. These passageways converge from the rear to the front end of each section as the curvature of walls 3 and 4 increases. At the dividing point of the core sections the passageways merge together in forming the lesser number of passageways in the next section of the core. This provision is clearly illustrated in Fig. 4 where passageways 8a, 8b, and 8c are shown merging into the single passageway 8d. There is thus provided an open communication from the rear of the panel to the front of the panel through each of the passageways 8.

The panel construction is thereby arranged so that passageways extend longitudinally from the front portion to the rear portion of the panel. The essential features are to allow open communication from the rear to the front of the panel while supplying walls of a type that will provide properly directed passageways, that will stiffen and reinforce the panel, and that will suitably space walls 3 and 4. This may be satisfactorily accomplished by certain variations from the configuration shown in Fig. 4. For example, it may be desirable to construct the panel in such a manner that walls 6 in section 10 are offset from the walls of the passageways in section 11 so that passageway 8a is open to passageway 8e as well as to 8d. In some cases where the curvature of the panel is slight or where the panel is small it may be possible to provide a core meeting these requirements without having the passageways subdivided toward the rear of the panel. Other designs might require subdivision into only two sections while still others might necessitate an even greater number of sections than the three sections 9, 10 and 11 herein described in detail.

A modification is illustrated in Fig. 5 in which the passageways in core 5 are subdivided without making sections 9, 10 and 11 separately as shown in Figs. 2 and 4. Here the passageways merge in a manner somewhat similar to that illustrated in Fig. 4 but the core is constructed in one piece which provides greater strength and rigidity than the other configuration although it is somewhat more difficult to construct.

The passageways 8 are arranged symmetrically about the axis of the panel so that there is access through all of the passages at the rear of the panel on one side of diameter 12 to the front portion of the panel and back to the rear portion of the panel along the other side of diameter 12. This arrangement is illustrated in Fig. 2.

With particular reference now to Fig. 3, there is secured along the inner circumference of the rear portion of the panel, covering the ends of passageways 8, a ring member 13 which may be fastened to walls 3 and 4 by any suitable means such as by a resinous material. Member 13 may be of any desired material but is preferably a glass fiber reinforced lamination such as is used for the other components of the panel. A series of holes 14 are provided in member 13, each giving access to a passageway 8. In order that these openings may be as large as possible, they are arranged alternately in two rows as illustrated and are therefore not too closely spaced. Secured over member 13 is a manifold 15 which may also be constructed of a glass fiber lamination and may be secured to member 13 by suitable means such as a resinous adhesive and to wall 3 by means of rivets 16. A gasket or other sealing means 17 may be disposed between adjacent surfaces of the manifold and member 13 while gasket 18 is interposed between member 13 and wall 3. Plates 19 and 20 divide manifold 15 into two sections along a diameter 12. Thus section 21 below diameter 12 may serve as the inlet manifold while section 22 above diameter 12 will act as an outlet manifold. Pipes 23 and 24 will provide access to the inlet and the outlet portions of the manifold respectively.

To effect anti-icing of the aircraft panel hot air or other heated fluid may be introduced through inlet pipe 23 into inlet manifold 21 from which it will enter the passageways 8 disposed below diameter 12 after passing through holes 14 in member 13. The heated fluid will travel down the panel between walls 3 and 4, through the converging passageways 8, to the nose portion of the panel, from where it will return on the other side of diameter 12 through the passageways and the openings in member 13, into the outlet portion of the manifold, and through outlet pipe 24. Thus, all of the heated fluid entering all of the passageways is directed through the front portion of the panel thereby concentrating all of the heated fluid at an increased rate of flow in this location which is the portion encountering the most severe icing conditions. A large quantity of heat is in this manner delivered to the portion of the panel where it is most needed while all sections of the panel will be provided with sufficient heat to effect anti-icing.

In the preferred embodiment of this invention, a third wall 25 is provided inside the panel parallel, or nearly so, to inner wall 4. Stiffening elements 26 interconnect wall 4 and wall 25 enabling this third wall to provide the structure with greater strength. This stiffening element may be of the conventional honeycomb construction and it and wall 25 may be of a glass fiber material, secured to wall 4 by a resinous material in the same manner that the other elements of the structure are bonded together. Such an additional wall with intermediate stiffeners 26 has been found to not only increase the strength of the panel but to provide more desirable radar transmission characteristics. A further advantage is noted in that the inner wall 25 and elements 26 provide an insulation inside the panel that will decrease the transmission of heat from passageways 8 to the interior of the panel enabling more of the heat to be used for anti-icing.

The foregoing detailed description is to be clearly understood as by way of illustration only and not to be taken by way of limitation, the spirit and scope of this invention being limited only by the accompanying claims.

We claim:

1. An anti-icing radome panel of substantially conoidal contour one end of said panel including a convergent vertex section, said panel comprising two walls in spaced relationship, structurally reinforcing elements interconnecting said walls in substantially perpendicular relationship therewith, thereby to provide a plurality of ducts between said walls, said ducts collectively converging toward the vertex section of said panel from either side of a diameter of said panel at the portion thereof remote from said vertex section, and arranged whereby fluid directed into said ducts on one side of said diameter at said remote portion is directed to the other side of said diameter at said remote portion thereof via said vertex section whereby said fluid attains maximum velocity at said convergent vertex section.

2. An anti-icing radome panel comprising an inner wall; and an outer wall, said walls being of conoidal contour including a convergent vertex section and disposed in spaced relationship; structurally reinforcing members secured to said walls, said members including spaced portions interconnecting said walls, said spaced portions being collectively convergent on said vertex section from either side of a diameter thereof, defining a plurality of passageways providing open communication from the section of said walls remote from said vertex section on one side of said diameter to said remote section of said walls on the other side of said diameter by way of said vertex section, said reinforcing members including a greater number of spaced portions interconnecting said walls at said remote section of said walls than at said vertex section, whereby said passageways are subdivided at said remote section of said walls and said remote section is given additional reinforcement; an inlet manifold connected with said remote section of said walls in communication with the passageways on one side of said diameter; and an outlet manifold connected with said remote section of said walls in communication with the passageways on the other side of said diameter.

3. A device as recited in claim 2 including in addition a third wall disposed interiorly of said panel in spaced relationship with the inner wall of said panel; and a honeycomb reinforcing element secured in interconnecting relationship between said third wall and said inner wall.

4. An anti-icing radome panel comprising two walls in spaced relationship, said walls being of a rounded conoidal contour including a convergent vertex section; structurally reinforcing members secured to said walls, said members including spaced elements interconnecting said walls and extending divergently from said vertex section on either side of a diameter thereof, whereby said interconnecting members define a plurality of open passageways adapted to transmit heated fluid from one side of the portion of said walls remote from said vertex portion to the other side of said remote portion by way of said vertex section, said reinforcing members including additional spaced elements interconnecting said walls at said rear portion thereof.

5. An anti-icing radome panel comprising two walls in spaced parallelism, said walls including a converging vertex section; structurally reinforcing elements secured to and disposed in substantially perpendicular interconnecting relationship between said walls to provide a plurality of passageways between said walls, a greater number of said elements being provided at the portion of said walls remote from said vertex section than at said vertex section, whereby said walls are provided with a greater number of passageways and more reinforcement at said remote portion than at said vertex section, said reinforcing elements being arranged in a convergent manner toward said vertex section from either side of a diameter of said remote portion of said walls, whereby fluid directed into said passageways on one side of said diameter at said remote portion of said walls flows to said remote portion on the other side of said diameter of said remote portion of said walls by way of said vertex section; a manifold connected with the passageways on said one side of said remote portion for introducing fluid therein; and a manifold connected with the passageways on said other side of said remote portion for removing said fluid.

6. A device as recited in claim 5 in which said panel is constructed of a glass fiber reinforced lamination having a resinous binder.

7. A device as recited in claim 6 including in addition a third wall disposed interiorly of said panel in spaced parallelism with the inner wall of said panel; and a honeycomb reinforcing element secured in interconnecting relationship between said third wall and said inner wall.

8. An anti-icing aircraft panel comprising a hollow member having a rounded exterior, one end including a convergent vertex section; means beneath the exterior surface of said hollow member providing a plurality of passageways convergent to said vertex section for transmitting heating fluid therethrough, said means being so constructed and arranged that heating fluid introduced at the end of said panel remote from said vertex section circulates to said vertex section and returns to said remote section; and a reinforcing layer disposed along the interior surface of said hollow member adjacent and interiorly of said means providing a plurality of passageways.

9. A device as recited in claim 8 in which said panel is constructed of a glass fiber reinforced lamination having a resinous binder.

References Cited in the file of this patent

UNITED STATES PATENTS

| | | |
|---|---|---|
| 1,842,736 | Stout | Jan. 26, 1932 |
| 2,190,490 | Sendzimir | Feb. 13, 1940 |
| 2,379,183 | Price | June 26, 1945 |
| 2,494,368 | Steele et al. | Jan. 10, 1950 |
| 2,514,105 | Thomas | July 4, 1950 |
| 2,540,482 | Hervey | Feb. 6, 1951 |
| 2,556,470 | Del Mar | June 12, 1951 |
| 2,560,287 | Harper | July 10, 1951 |
| 2,581,760 | Harpoothian et al. | Jan. 8, 1952 |
| 2,593,714 | Robinson | Apr. 22, 1952 |

FOREIGN PATENTS

| | | |
|---|---|---|
| 609,313 | Great Britain | Sept. 29, 1948 |
| 871,408 | France | Jan. 15, 1942 |